(12) United States Patent
Couchou-Meillot

(10) Patent No.: US 12,007,034 B2
(45) Date of Patent: Jun. 11, 2024

(54) INJECTION VALVE FOR AN ANALYSIS APPARATUS

(71) Applicant: Total SE, Courbevoie (FR)

(72) Inventor: Gilles Couchou-Meillot, Courbevoie (FR)

(73) Assignee: TotalEnergies Onetech (previously TotalEnergies One Tech), Courbevoie (FR)

( * ) Notice: Subject to any disclaimer, the term of this patent is extended or adjusted under 35 U.S.C. 154(b) by 510 days.

(21) Appl. No.: 17/424,861

(22) PCT Filed: Jan. 22, 2019

(86) PCT No.: PCT/IB2019/000102
§ 371 (c)(1),
(2) Date: Jul. 21, 2021

(87) PCT Pub. No.: WO2020/152495
PCT Pub. Date: Jul. 30, 2020

(65) Prior Publication Data
US 2022/0090689 A1  Mar. 24, 2022

(51) Int. Cl.
*G01N 30/20* (2006.01)
*F16K 11/074* (2006.01)
*F16K 27/04* (2006.01)

(52) U.S. Cl.
CPC ........ *F16K 11/0743* (2013.01); *F16K 27/045* (2013.01); *G01N 30/20* (2013.01); *G01N 2030/202* (2013.01)

(58) Field of Classification Search
CPC ............. G01N 30/20; G01N 2030/202; G01N 2030/025; F16K 11/0743; F16K 27/045
See application file for complete search history.

(56) References Cited

U.S. PATENT DOCUMENTS

| 2,911,008 A | 11/1959 | Du Bois |
| 2,972,246 A | 2/1961 | Reinecke et al. |
| (Continued) | | |

FOREIGN PATENT DOCUMENTS

FR  2882125 A1  8/2006

OTHER PUBLICATIONS

International Search Report In PCT application No. PCT/IB2019/000102 dated Aug. 28, 2019 in 3 pages.

*Primary Examiner* — Suman K Nath
(74) *Attorney, Agent, or Firm* — Knobbe, Martens, Olson & Bear, LLP

(57) ABSTRACT

The present invention relates to an injection valve for an analysis apparatus comprising an analysis column, the injection valve comprising a rotative body compressed against a base by a compressive element, the rotative body comprising a lower surface in contact with the base and at least one recess on the lower surface configured to receive a fluid sample, wherein the base comprises a vaporization chamber which comprises an injection conduit having an upper end and a lower end, the vaporization chamber further comprising a carrier phase inlet in fluid communication with the injection conduit, wherein the injection conduit is configured for being in fluid communication with the analysis column of the analysis apparatus via the lower end when the injection valve is mounted on the analysis apparatus, and wherein, in an injection configuration of the rotative body, the recess is in fluid communication only with the injection conduit, via the upper end thereof. The present invention further relates to an analysis set comprising said injection valve and to a method of analyzing a fluid in said analysis set.

20 Claims, 1 Drawing Sheet

(56) References Cited

U.S. PATENT DOCUMENTS

| | | |
|---|---|---|
| 3,475,950 A | 11/1969 | Ferrin |
| 3,526,136 A | 9/1970 | Caldwell et al. |
| 3,887,345 A | 6/1975 | Pollock et al. |
| 5,803,951 A | 9/1998 | Wada et al. |
| 2015/0346165 A1 | 12/2015 | Roecker et al. |
| 2018/0128786 A1* | 5/2018 | Takemoto ............... G01N 30/12 |
| 2020/0010249 A1* | 1/2020 | Komori ................ B65D 81/325 |

* cited by examiner

INJECTION VALVE FOR AN ANALYSIS APPARATUS

TECHNICAL FIELD

The present invention relates to an injection valve which can be fitted on an analysis apparatus, for the purpose of analyzing a fluid sample, in particular a sample of hydrocarbon fluid, in particular at high temperature and/or high pressure.

TECHNICAL BACKGROUND

Hydrocarbons in an underground reservoir can be recovered or produced by means of one or more wells drilled in the reservoir. Before production begins, the formation, which is a porous medium, is saturated with hydrocarbons.

The initial recovery of hydrocarbons is generally carried out by techniques of "primary recovery", in which only the natural forces present in the reservoir are relied upon. In this primary recovery, only part of the hydrocarbons is ejected from the pores by the pressure of the formation. Typically, once the natural forces are exhausted and primary recovery is completed, there is still a large volume of hydrocarbons left in the reservoir, generally more than two thirds.

This phenomenon has led to the development of enhanced oil recovery (EOR) techniques. Many of such EOR techniques rely on the injection of a fluid into the reservoir in order to produce an additional quantity of hydrocarbons. The fluid used can in particular be an aqueous solution, such as brine (optionally in combination with chemicals), which is injected via one or more injection wells.

In order to optimize and facilitate hydrocarbon recovery, it is useful to be able to perform an analysis of the composition of a hydrocarbon fluid present in a reservoir, in order to accordingly adjust various parameters of the recovery. It is even more preferable to be able to perform such analysis in real time in the hydrocarbon reservoir. Indeed, a hydrocarbon fluid from a reservoir is a complex mixture of many different hydrocarbon compounds. Depending on the composition of the mixture, its physicochemical properties and its ability to be recovered in given conditions will vary.

Gas phase chromatography, in particular, is a useful tool for analyzing a hydrocarbon fluid from an underground reservoir.

Document GB 2 290 283 relates to a high-speed rotary injection valve including a rotor having an exterior surface and a first slice on its exterior surface, and a housing defining a central bore for receiving the rotor, for the injection of a sample fluid volume in chromatography. Small sample volumes can be supplied with this apparatus.

Document WO 2017/098565 relates to an opening sealing structure having a structure in which a cap can be attached to and detached from a portion having an opening, such as a sample vaporizing unit of a gas chromatograph.

Document U.S. Pat. No. 7,503,203 relates to a rotary valve for fluid analytical systems which provides improved characteristics such as an extended lifetime. The valve can fulfil different fluid analytical functions and can be a multi-ports and/or a multi-positions valve. The valve also comprises extra recesses in the rotor which allow to cancel the effect of any possible leaks by evacuating them.

Document U.S. Pat. No. 8,544,350 describes a sample injector for injecting a fixed amount of a sample into a mobile phase medium and discharging the mobile phase medium with the sample outside the injector during a chromatographic analysis. The sample injector includes a first member having a medium passage for supplying the mobile phase medium and a sample passage for supplying the sample and a second member having a discharge passage for discharging the mobile phase medium with the sample to an outside of the injector. The first member and the second member are configured to move to a sample charging position and a sample injection position.

Document U.S. Pat. No. 6,155,123 describes a sample inject valve system which enables a modified sample injection valve to perform functions that are required to inject a sample into a chromatographic column. The modified valve includes a stator with twelve passages lying on a circle centered on a rotor axis and a rotor with four channels for connecting selected passages.

Document GB 855,234 relates to a sampling device for chromatographic analysis apparatus in which a part of the flow path of a stream of sample substance can be introduced into a stream of a carrier gas. More particularly, the sampling device is connected to inlet and outlet conduits for the sample to be analyzed, and is also connected to inlet and outlet tubes for the carrier gas and it affords a flow path either between said conduits or between said tubes. By switching from one path to the other, a sample is enclosed and transferred from the test stream to the carrier stream.

Document GB 1,428,364 relates to a gas chromatography apparatus wherein a transfer apparatus is provided for transferring a porous body from a first location, spaced from the entrance of a gas chromatography column, and in which it can adsorb vapor from an atmosphere under test, to a second location adjacent to the entrance of said gas chromatography column where it can desorb vapor into the gas chromatography column.

Document U.S. Pat. No. 7,823,468 relates to a sample injector which includes a rotary valve element with a straight passageway through it, which element may be rotated to connect a port communicating with a source of solvent with a port communicating with an inlet to a column. The valve element may be rotated to one position in which it provides a straight path for a sample to be injected, a second position in which it provides a path that connects a source of purge gas to the chromatographic system and a third position in which it provides a path that connects solvent to the column for preconditioning.

Document U.S. Pat. No. 4,068,528 describes a two-position rotary valve for injecting a liquid sample into a stream of solvent and flowing through a liquid chromatographic column. The valve is switchable between a load position and an inject position. The valve includes a needle cavity axially extending along the valve's rotor axis of rotation.

Document 2011/0153225 relates to a system and method for composition and volumetric analysis of vent gasses and detection of water flooding in an annular space of a flexible pipe structure.

There is still a need for an improved injection valve which can be adapted to any analytical apparatus comprising an analysis column, such as a gas chromatography apparatus, which can be conveniently used for the accurate analysis of a hydrocarbon fluid, and notably for the in situ analysis of hydrocarbon fluid from an underground reservoir.

SUMMARY OF THE INVENTION

It is a first object of the invention to provide an injection valve for an analysis apparatus comprising an analysis column, the injection valve comprising a rotative body compressed against a base by a compressive element, the rotative body comprising a lower surface in contact with the base and at least one recess on the lower surface configured to receive a fluid sample, wherein the base comprises a vaporization chamber which comprises an injection conduit having an upper end and a lower end, the vaporization chamber further comprising a carrier phase inlet in fluid communication with the injection conduit, wherein the injection conduit is configured for being in fluid communication with the analysis column of the analysis apparatus via the lower end when the injection valve is mounted on the analysis apparatus, and wherein, in an injection configuration of the rotative body, the recess is in fluid communication only with the injection conduit, via the upper end thereof.

According to some embodiments, the recess has a diameter parallel to the lower surface of the rotative body which is equal to or lower than 1 mm.

According to some embodiments, the recess has a depth perpendicular to the lower surface of the rotative body which is from 0.1 to 1 mm, and preferably from 0.2 to 0.8 mm.

According to some embodiments, the recess is configured to accommodate a volume of fluid sample from 0.05 to 0.5 μL.

According to some embodiments, the rotative body comprises more than one recesses, preferably from 2 to 10 recesses, wherein, each recess is in fluid communication only with the injection conduit via the upper end thereof, in various respective injection configurations of the rotative body.

According to some embodiments, the more than one recesses have the same diameter parallel to the lower surface of the rotative body and different depths perpendicular to the lower surface of the rotative body.

According to some embodiments, the more than one recesses are configured to receive different volumes of fluid sample.

According to some embodiments, the rotative body has an external diameter from 5 to 15 mm, and preferably from 7 to 10 mm.

According to some embodiments, the compressive element comprises a plurality of washers, at least one piston and at least one rotation element.

According to some embodiments, the injection conduit has an internal diameter from 0.2 to 1 mm.

According to some embodiments, in the injection configuration, the totality of the recess faces the upper end of the injection conduit.

According to some embodiments, the carrier phase inlet is connected to the injection conduit adjacent to the upper end thereof.

According to some embodiments, the base comprises at least one sample inlet channel and at least one sample outlet channel, and the recess is in fluid communication with the sample inlet channel and the sample outlet channel in a sampling configuration of the rotative body.

According to some embodiments, the base comprises at least one solvent inlet channel and at least one fluid solvent outlet channel, and the recess is in fluid communication with the solvent inlet channel and the solvent outlet channel in a washing configuration of the rotative body.

According to some embodiments, the rotative body and the base are made of materials chosen from metals such as titanium, ceramics, or a durable high-performance polyimide-based plastic.

The invention further relates to an analysis set comprising an analysis apparatus comprising an analysis column, and the injection valve described above mounted thereon.

According to some embodiments, the analysis apparatus is a gas chromatography apparatus.

The invention further relates to a method of analyzing a fluid in the analysis set described above, wherein:
a fluid sample is loaded into the recess when the rotative body is in the sampling configuration;
the injection conduit is continuously swept by a carrier phase;
the rotative body is rotated to the injection configuration;
the fluid sample is transferred to the analysis column via the injection conduit owing to the carrier phase.

According to some embodiments, the carrier phase is a carrier gas.

According to some embodiments, the injection conduit is at a temperature from 15 to 300° C., preferably of at least 50° C.

According to some embodiments, the injection conduit is heated and/or the carrier phase is preheated prior to sweeping the injection conduit.

According to some embodiments, the fluid sample is at a pressure from 1 to 800 bar, preferably of at least 100 bar, when it is loaded.

According to some embodiments, the pressure within the injection conduit is from 0.5 to 2.0 bar, preferably from 1.0 to 1.5 bar.

According to some embodiments, the fluid is a hydrocarbon fluid, preferably collected from a subterranean formation.

According to some embodiments, the method is implemented inside a well drilled in a subterranean formation, the fluid being a hydrocarbon fluid collected from the subterranean formation.

The present invention makes it possible to address the need mentioned above. In particular, the invention provides an improved injection valve which can be adapted to any analytical apparatus comprising an analysis column, such as a gas chromatography apparatus, which can be conveniently used for the accurate analysis of a hydrocarbon fluid, and notably for the in situ analysis of hydrocarbon fluid from an underground reservoir.

The invention makes it in particular possible to handle a very small sample of fluid in conditions of elevated temperature and/or elevated pressure which can be found in a subterranean formation. At the time the sample is injected into the analysis apparatus, it is immediately expanded and vaporized. At this stage, it is important to minimize or completely eliminate any dead volume in the fluidic circuitry, i.e. any volume through which the fluid needs to travel before being effectively vaporized.

All prior art devices described above comprise such dead volumes, which result in an inaccurate analysis of the fluid, due to a change in composition between the fluid in the sample and the fluid which reaches the analysis apparatus, because e.g. of condensation of some components of the fluid in the dead volumes.

This is achieved by providing an injection valve which comprises a rotative body comprising a recess on a lower surface, in which a fluid sample can be loaded. In one configuration of the rotative body, the recess is in fluid communication only with an injection conduit of a vaporization chamber, so as to transfer the sample to an analysis portion of the apparatus. The entirety of the sample is thus immediately expanded and vaporized in the injection conduit, without any need for the sample to first travel through further passages or channels that would represent dead volumes.

The injection valve of the present invention can be used at elevated pressure (up to 800 bar) and elevated temperature (up to 250° C.), which makes it possible to analyze the composition of a hydrocarbon fluid from a subterranean formation in real time. This allows a significant time saving during the evaluation of hydrocarbon fluids as it limits the number of samples to be collected, transported and analyzed.

The injection valve of the present invention can be adapted to any type of analysis apparatus comprising an analysis column and can substitute a classic injector, to provide the advantages mentioned above.

DESCRIPTION OF EMBODIMENTS

The invention will now be described in more detail without limitation in the following description.
Injection Valve The present invention relates to an injection valve for injecting a sample fluid into an analysis apparatus comprising an analysis column.

Figure 1:
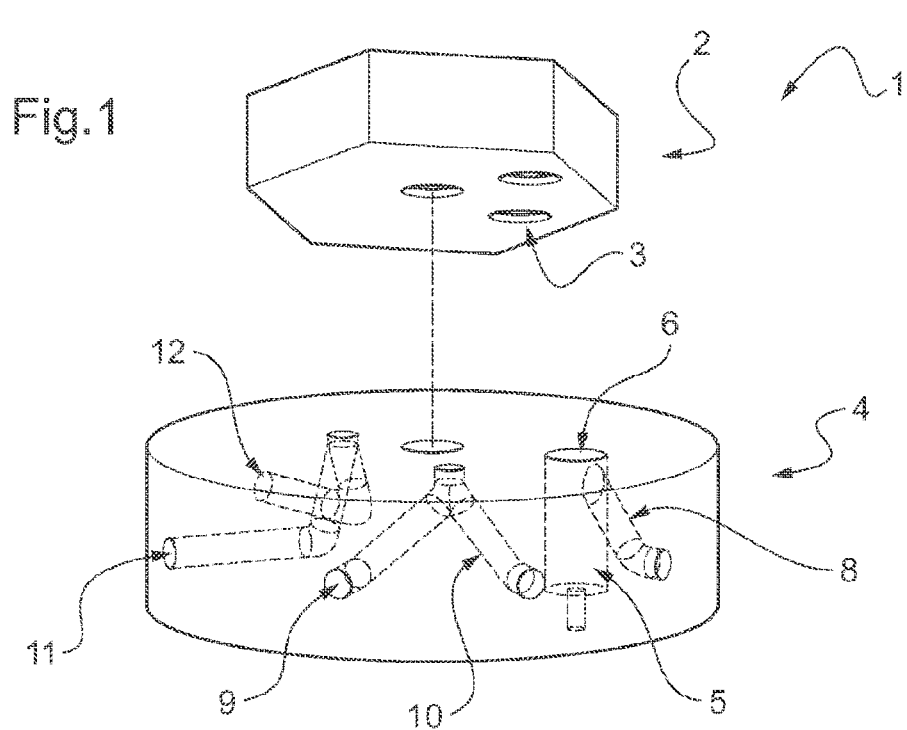
In FIGS. 1 and 2, an injection valve according to the invention is illustrated in a schematic manner.
Figure 2:
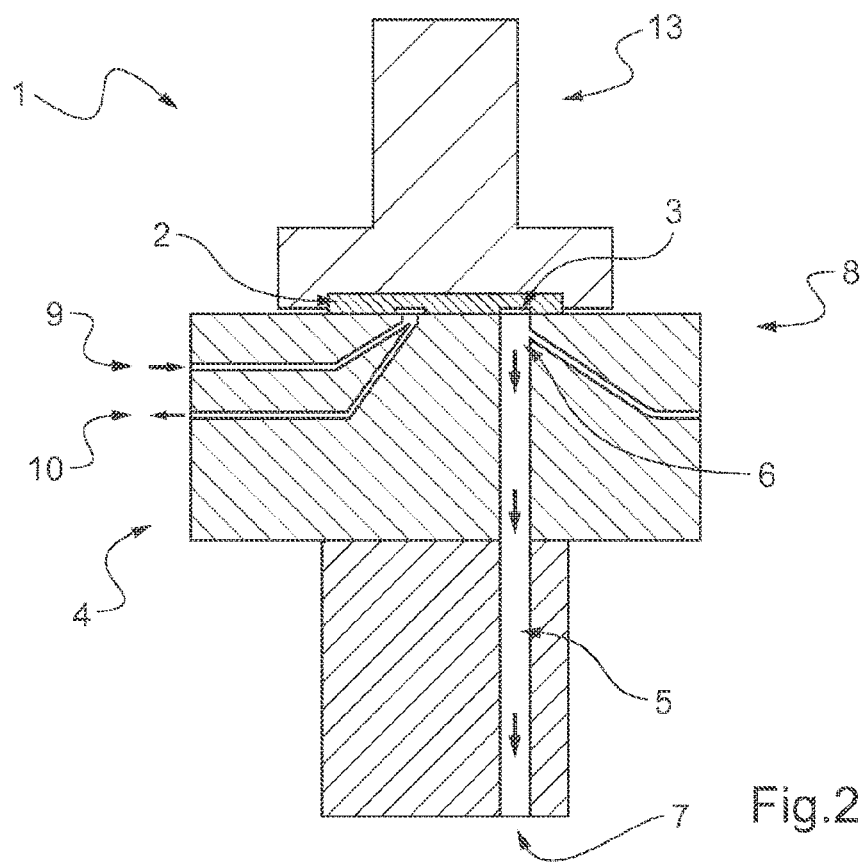

Referring to FIGS. 1 and 2, the injection valve 1 comprises a rotative body 2 comprising an upper surface and a lower surface. The lower surface is preferably plane. The upper surface is preferably also plane and parallel to the lower surface.

A rotation axis can be defined, around which the rotative body 2 is able to rotate.

The rotative body 2 may have a disc-shape perpendicular to the rotation axis.

The upper surface and lower surface of the rotative body 2 are arranged on the respective ends of the rotative body 2 along the rotation axis.

The lower surface is preferably orthogonal to the rotation axis.

The upper surface is also preferably orthogonal to the rotation axis.

The disc shape of the rotative body 2 may be circular or polygonal, such as for example square, pentagonal, hexagonal or octagonal.

The external diameter of the rotative body 2 may be from 5 to 15 mm, and preferably from 7 to 10 mm. For example, the rotative body 2 may have an external diameter from 5 to 7 mm; or from 7 to 9 mm; or from 9 to 11 mm; or from 11 to 13 mm; or from 13 to 15 mm. The diameter is the maximum external dimension of the rotative body 2, in a plane perpendicular to the rotation axis.

The lower surface of the rotative body 2 comprises at least one recess 3, which is configured to receive a fluid sample.

The recess 3 may have a circular or polygonal periphery on the lower surface of the rotative body 2.

According to some embodiments, the recess 3 may have a diameter equal to or lower than 1 mm. For example, the diameter of the recess 3 may be from 0.05 to 0.1 mm; or from 0.1 to 0.2 mm; or from 0.2 to 0.3 mm; or from 0.3 to 0.4 mm; or from 0.4 to 0.5 mm; or from 0.5 to 0.6 mm; or from 0.6 to 0.7 mm; or from 0.7 to 0.8 mm; or from 0.8 to 0.9 mm; or from 0.9 to 1 mm. The diameter of the recess 3 is the maximum dimension of the recess 3 orthogonal to the rotation axis (i.e. preferably parallel to the lower surface).

According to some embodiments, the recess 3 may have a depth from 0.1 to 1 mm, and preferably from 0.2 to 0.8 mm. Therefore, the recess 3 may notably have a depth from 0.1 to 0.2 mm; or from 0.2 to 0.3 mm; or from 0.3 to 0.4 mm; or from 0.4 to 0.5 mm; or from 0.5 to 0.6 mm; or from 0.6 to 0.7 mm; or from 0.7 to 0.8 mm; or from 0.8 to 0.9 mm; or from 0.9 to 1 mm. The depth of the recess 3 is the maximum dimension of the recess 3 parallel to the rotation axis (i.e. preferably perpendicular to the lower surface).

The volume of fluid sample which can be accommodated in the recess 3 may be from 0.05 to 0.5 µL. For example, this volume may be from 0.005 to 0.1 µL; or from 0.1 to 0.2 µL; or from 0.2 to 0.3 µL; or from 0.3 to 0.4 µL; or from 0.4 to 0.5 µL.

According to some embodiments, the rotative body 2 may comprise a single recess 3.

According to other preferred embodiments, the rotative body 2 may comprise more than one recesses 3, preferably from 2 to 10. For example, the rotative body 2 may comprise 2, or 3, or 4, or 5, or 6, or 7, or 8, or 9, or 10. Preferably, the rotative body 2 comprises at least 3 recesses.

The more than one recesses 3 may have the same diameter or different diameters.

The more than one recesses 3 may have the same depth or different depths.

According to some embodiments, the more than one recesses 3 may have the same diameter and the same depth.

According to some embodiments, the more than one recesses 3 may have the same diameter and different depths.

According to some embodiments, the more than one recesses 3 may have different diameters and the same depth.

According to some embodiments, the more than one recesses 3 may have different diameters and different depths.

Preferably, the more than one recesses 3 may have the same diameter and different depths. For example, if three recesses 3 are present on the lower surface of the rotative body 2, they may all have the same diameter and the same depth, or they may all have the same diameter and two of the three recesses 3 may have same depth, or they may all have the same diameter and different depths.

Therefore, according to some embodiments, the more than one recesses 3 may be able to accommodate the same volume of a fluid sample. Preferably, the more than one recesses 3 may be able to accommodate different volumes of a fluid sample.

The use of several recesses 3 is particularly useful to load different volumes of samples, depending on the selected recess 3, as the injection can then be adapted to the nature of the fluid; for example heavy fluids tend to require larger volumes while lighter fluids tend to require smaller volumes.

The rotative body 2 may be made from a material chosen from metal or ceramic or a durable high-performance polyimide-based plastic such as Vespel®. When the rotative body 2 is made from metal, the metal can be chosen from stainless steel or hastelloy or titanium.

According to some embodiments, the rotative body 2 may be polished or covered by a coating depending on the operating conditions the injection valve 1 will be used in (temperature, pressure, type of fluid).

The rotative body 2 according to the invention is compressed against a base 4 by a compressive element 13, and is rotatable about the rotation axis with respect to the base 4. The base 4 comprises an upper surface in contact with the lower surface of the rotative body 2, and which is preferably parallel to said lower surface of the rotative body 2. The base 4 is preferably cylinder-shaped, the axis of the cylinder being parallel to or aligned with the rotation axis of the rotative body 2. The external cross-section of the cylinder may preferably be circular or polygonal. The base 4 may comprise an external lateral surface which extends along the cylinder axis.

The base 4 may be made from a material chosen from metal or ceramic or a durable high-performance polyimide-based plastic. When the base 4 is made from metal, the metal can be chosen from stainless steel or hastelloy or titanium.

The base 4 comprises a vaporization chamber 5. The vaporization chamber 5 comprises an injection conduit.

The injection conduit comprises an upper end 6 on the upper surface of the base 4, and a lower end 7 opposite the upper end 6. The vaporization chamber 5 may be provided with a heating element such as an electric resistance. The heating of the vaporization chamber may also be carried out by heat conduction, laser heating, or Joule heating.

The lower surface of the rotative body 2 is in contact with and compressed against the upper surface of the base 4 in order to seal them together in a gastight manner.

The conduit formed between the upper end 6 and the lower end 7 may have a diameter (internal diameter) from 0.2 to 1 mm. For example, this diameter may be from 0.2 to 0.3 mm; or from 0.3 to 0.4 mm; or from 0.4 to 0.5 mm; or from 0.5 to 0.6 mm; or from 0.6 to 0.7 mm; or from 0.7 to 0.8 mm; or from 0.8 to 0.9 mm; or from 0.9 to 1 mm.

The vaporization chamber 5 may have an external diameter from 5 to 20 mm, and preferably from 10 to 15 mm. For example, this diameter may be from 5 to 7 mm; or from 7 to 10 mm; or from 10 to 12 mm; or from 12 to 14 mm; or from 14 to 16 mm; or from 16 to 18 mm; or from 18 to 20 mm. By "external diameter" it is meant the maximal dimension of the vaporization chamber 5 in a cross-section perpendicular to the axis of the base cylinder. Preferably, the surface area of the cross-section of the vaporization chamber 5 perpendicular to the axis of the base cylinder is preferably constant from the upper end 6 to the lower end 7.

The base 4 is provided with a carrier phase inlet 8. In the following, the carrier phase will further described be as a carrier gas for the sake of simplicity. The carrier gas may notably be chosen from $H_2$ and He.

The carrier gas inlet 8 may comprise a conduit, the output of which is fluidically connected to the injection conduit. In preferred embodiments, the connection is located adjacent to the upper end 6 of the injection conduit. The carrier gas inlet 8 may be oriented along a straight line. Furthermore, the carrier gas inlet 8 may form an angle with the injection conduit at the connection. This angle may be from 10 to 90°. For example, the angle that the carrier gas inlet 8 forms with the conduit may be from 10 to 20°; or from 20 to 30°; or from 30 to 40°; or from 40 to 50°; or from 50 to 60°; or from 60 to 70°; or from 70 to 80°; or from 80 to 90°.

According to some embodiments, the carrier gas inlet 8 may extend from an input located on the lateral surface of the base 4 to the output which may be situated at less than 2 mm, preferably less than 1 mm, more preferably less than 0.5 mm, most preferably less than 0.2 mm, from the upper surface of the base 4.

The injection conduit is preferably in direct fluid communication with the analysis column of the analysis apparatus via the lower end 7, when the injection valve 1 is mounted on the analysis apparatus. By "direct communication" is meant without intermediate conduits, channels or tubing. In other words, the injection valve 1 of the present invention is placed so that the lower end 7 of the injection conduit is adjacent to the entrance of the analysis column of the analysis apparatus.

The base 4 may also comprise channels, for example, in the form of conduits extending from the lateral surface of the base 4 to its upper surface. Such channels may include one or more sample inlet channels 9, one or more sample outlet channels 10, one or more washing inlet channels 11 and one or more washing outlet channels 12, which will be individually described below.

These channels may have a diameter from 0.2 mm to 0.5 mm.

The rotative body 2 may have different configurations, depending on its angular position around the rotation axis.

In particular, the rotative body 2 has at least one injection configuration. If several recesses 3 are present, the rotative body 2 may have several injection configurations, namely one per recess 3.

In the injection configuration, the rotative body 2 is arranged in such way that the recess 3 is in fluid communication with the injection conduit, and only in fluid communication with this injection conduit. In other terms, in this configuration, the recess 3 is not in fluid communication with another channel or conduit.

The recess 3 is therefore located opposite the upper end 6 of the injection conduit. Preferably, the totality of the recess 3 faces the upper end 6 (i.e. opening) of the injection conduit. The cross-section of the recess 3 and of the upper end 6 of the injection conduit may be identical, and the recess 3 may be perfectly aligned with the upper end 6 of the injection conduit in the injection configuration.

In other embodiments, the cross-section of the recess 3 may be smaller than the cross-section of the upper end 6 of the injection conduit.

The rotative body 2 may also have one sampling configuration, and optionally one washing configuration. When several recesses 3 are present, all injection, sampling and washing configurations may be different, i.e. may correspond to distinct angular positions of the rotative body 2. Alternatively, an injection configuration for one recess 3 may be the same as a sampling or a washing position for another recess 3.

In the sampling configuration, the rotative body 2 is arranged in such way that the recess 3 is in fluid communication with a sample inlet channel 9 and a sample outlet channel 10 of the base 4. The sample inlet channel 9 may be fluidically connected to a source of fluid to be analyzed, while the sample outlet channel 10 may be fluidically connected to a disposal element.

In the washing configuration, the rotative body 2 is arranged in such way that the recess 3 is in fluid communication with a solvent inlet channel 11 and a solvent outlet channel 12 of the base 4. The solvent inlet channel 11 may be fluidically connected to a source of solvent and the solvent outlet channel 12 may be fluidically connected to a disposal element.

The compressive element 13 which compresses the rotative body 2 against the base 4 may comprise a plurality of washers, at least one piston and at least one rotation element.

The washers may for instance be coned-disk springs called "Belleville washers". The washers may be stacked together in order to form a spring having an upper surface and a lower surface. Adjacent washers may have alternating orientations. The spring of washers can be compressed by rotation of the rotation element which is in contact with the upper surface of the spring. The compression depends on the number of washers as well as the number of rotation turns carried out by the rotation element. Due to the compression of the spring, pressure is exerted on the piston placed at a lower end of the spring.

According to some embodiments, the compressive element 13 may comprise from 2 to 12 washers.

The piston can be made from a material chosen from stainless steel or hastelloy or titanium.

The rotation of the rotation element may be performed manually, or with a motor. For example, the rotation element may be a manual torque wrench or a low voltage motor (such as but not limited to step by step motor, any motor where the angular position can be controlled precisely).

The injection valve 1 may have a height equal to or lower than 200 mm, preferably equal to or lower than 150 mm, and more preferably equal to or lower than 110 mm. For example, the injection valve 1 may have a height from 70 to 80 mm; or from 80 to 90 mm; or from 90 to 100 mm; or from 100 to 120 mm; or from 120 to 140 mm; or from 140 to 160 mm; or from 160 to 180 mm; or from 180 to 200 mm. By "height" it is meant the distance between the lower end 7 of the injection conduit and the opposite extremity of the injection valve 1.

Analysis Apparatus

The invention further relates to an analysis apparatus comprising an analysis column. The injection valve 1 described above can be mounted on this analysis apparatus, in order to perform the injection of a sample of fluid into the analysis column.

The analysis column may be in particular a capillary tube filled with a stationary phase.

Preferably, the analysis apparatus is a gas chromatography apparatus.

The injection valve 1 of the present invention can be adapted to any type of analysis apparatus comprising a column in order to replace existing injectors.

The analysis apparatus may also comprise detection means in order to detect and analyze the components of the fluid sample, or in order to measure any other property of the fluid sample.

An analysis set may comprise the analysis apparatus and the injection valve 1 mounted thereon.

The analysis set may further comprise one or more chambers or elements configured to be connected to the injection valve 1, and configured to provide the fluid to be analyzed, one or more solvents for rinsing, carrier gas, or to receive any discharged fluids.

The analysis set may in particular be used to analyze the composition of a fluid, preferably by gas phase chromatography. Preferably, such fluid is a hydrocarbon fluid recovered from a subterranean formation. It is preferably a complex fluid comprising various hydrocarbon compounds and optionally water as well as contaminants or chemicals used in the process of hydrocarbon recovery (surfactants, carbon dioxide, etc.).

However, it will be understood that other types of fluids may also be analyzed with the analysis apparatus comprising the injection valve 1 of the present invention, in particular complex fluids comprising a mixture of different chemical compounds.

Method for Analyzing a Fluid

The method of analyzing a fluid according to the invention comprises a first step of loading a sample of fluid in a recess 3 of the rotative body 2. In this first step, the rotative body 2 is in the sampling configuration (as described previously). Fluid is input from the sample inlet channel 9, through the recess 3, and to the output sample channel 10, for a certain period of time. Said loading is preferably effected at a pressure of from 1 to 800 bar, such as at a pressure of from 1 to 100 bar; or from 100 to 200 bar; or from 200 to 300 bar; or from 300 to 400 bar; or from 400 to 500 bar; or from 500 to 600 bar; or from 600 to 700 bar; or from 700 to 800 bar. One or more valves are then closed to stop the flow of fluid.

The rotative body 2 is then rotated away from the loading configuration. The recess 3 is then sealingly closed by the upper surface of the base 4, and the sample of fluid loaded in the recess 3 is transported to another position. The fluid within the recess 3 remains at the loading pressure described above.

In a next step, the rotative body 2 is rotated to the injection configuration (as described previously) wherein the recess 3 is in fluid communication with the injection conduit of the vaporization chamber 5. Carrier gas supplied from the carrier gas inlet 8 preferably continuously sweeps the injection conduit. The fluid sample is transferred from the recess 3 to the injection conduit, where it is expanded and preferably vaporized.

The temperature in the injection conduit of the vaporization chamber 5 may be from 15 to 300° C. The temperature may e.g. be from 15 to 25° C.; or from 25 to 50° C.; or from 50 to 75° C.; or from 75 to 100° C.; or from 100 to 125° C.; or from 125 to 150° C.; or from 150 to 175° C.; or from 175 to 200° C.; or from 200 to 225° C.; or from 225 to 250° C.; or from 250 to 275° C.; or from 275 to 300° C. The vaporization chamber 5 may be heated and/or the carrier gas may be preheated in order to control the temperature in the injection conduit.

The fact that the temperature in the injection conduit may be up to 300° C. presents an advantage as the injection valve may be used to analyze a sample at reservoir conditions.

The pressure in the injection conduit may be from 0.5 to 2.0 bar, and more preferably from 1.0 to 1.5 bar.

After its exit from the injection conduit of the vaporization chamber 5, the fluid sample passes through the column of the analysis apparatus where it is analyzed, such as by separating its different components and detecting them.

Optionally, the method may comprise a subsequent step of rotating the rotative body 2 to the washing configuration (as described previously), wherein the recess 3 is rinsed with solvent supplied by the solvent inlet channel 11, and discharged to the solvent outlet channel 12.

The method of the present invention may be used for the analysis of fluids which are collected at high pressures and temperatures.

According to preferred embodiments, the analysis apparatus of the present invention may be used for the real time analysis of a hydrocarbon fluid in a hydrocarbon reservoir.

In some embodiments, the method is implemented in situ, in a well drilled in a subterranean formation.

The method of the present invention may be used to perform at least 100 consecutive analyses of sample fluids according to the procedure described above.

For example, the method of the present invention may be used to perform from 100 to 200; or from 200 to 300; or from 300 to 500; or from 500 to 700 consecutive analyses.

The invention claimed is:

1. An injection valve for an analysis apparatus comprising an analysis column, the injection valve comprising a rotative body compressed against a base by a compressive element, the rotative body comprising a lower surface in contact with the base and at least one recess on the lower surface configured to receive a fluid sample, wherein the base comprises a vaporization chamber which comprises an injection conduit having an upper end and a lower end, the vaporization chamber further comprising a carrier phase inlet in fluid communication with the injection conduit, wherein the injection conduit is configured for being in fluid communication with the analysis column of the analysis apparatus via the lower end when the injection valve is mounted on the analysis apparatus, and wherein, in an injection configuration of the rotative body, the recess is in fluid communication only with the injection conduit, via the upper end thereof.

2. The injection valve according to claim 1, wherein the recess has a diameter parallel to the lower surface of the rotative body which is equal to or lower than 1 mm and/or wherein the recess has a depth perpendicular to the lower surface of the rotative body which is from 0.1 to 1 mm.

3. The injection valve according to claim 1, wherein the recess is configured to accommodate a volume of fluid sample from 0.05 to 0.5 μL.

4. The injection valve according to claim 1, wherein the rotative body comprises more than one recesses, wherein, each recess is in fluid communication only with the injection conduit via the upper end thereof, in various respective injection configurations of the rotative body.

5. The injection valve according to claim 4, wherein the more than one recesses have the same diameter parallel to the lower surface of the rotative body and different depths perpendicular to the lower surface of the rotative body.

6. The injection valve according to claim 4, wherein the more than one recesses are configured to receive different volumes of fluid sample.

7. The injection valve according to claim 1, wherein the compressive element comprises a plurality of washers, at least one piston and at least one rotation element.

8. The injection valve according to claim 1, wherein, in the injection configuration, the totality of the recess faces the upper end of the injection conduit.

9. The injection valve according to claim 1, wherein the carrier phase inlet is connected to the injection conduit adjacent to the upper end thereof.

10. The injection valve according to claim 1, wherein the base comprises at least one sample inlet channel and at least one sample outlet channel, and wherein the recess is in fluid communication with the sample inlet channel and the sample outlet channel in a sampling configuration of the rotative body.

11. The injection valve according to claim 1, wherein the base comprises at least one solvent inlet channel and at least one fluid solvent outlet channel, and wherein the recess is in fluid communication with the solvent inlet channel and the solvent outlet channel in a washing configuration of the rotative body.

12. An analysis set comprising an analysis apparatus comprising an analysis column, and the injection valve of claim 1 mounted thereon.

13. The analysis set according to claim 12, wherein the analysis apparatus is a gas chromatography apparatus.

14. A method of analyzing a fluid in the analysis set of claim 12, wherein:
a fluid sample is loaded into the recess when the rotative body is in the sampling configuration;
the injection conduit is continuously swept by a carrier phase;
the rotative body is rotated to the injection configuration;
the fluid sample is transferred to the analysis column via the injection conduit owing to the carrier phase.

15. The method according to claim 14, wherein the carrier phase is a carrier gas.

16. The method according to claim 14, wherein the injection conduit is at a temperature from 15 to 300° C., and/or wherein the injection conduit is heated and/or the carrier phase is preheated prior to sweeping the injection conduit.

17. The method according to claim 14, wherein the fluid sample is at a pressure from 1 to 800 bar, when it is loaded.

18. The method according to claim 14, wherein the pressure within the injection conduit is from 0.5 to 2.0 bar.

19. The method according to claim 14, wherein the fluid is a hydrocarbon fluid.

20. The method according to claim 14, which is implemented inside a well drilled in a subterranean formation, the fluid being a hydrocarbon fluid collected from the subterranean formation.

* * * * *